US008373686B2

(12) United States Patent
Huang

(10) Patent No.: US 8,373,686 B2
(45) Date of Patent: Feb. 12, 2013

(54) MULTI-LEVEL POINT-TO-POINT TRANSMISSION SYSTEM AND TRANSMITTER CIRCUIT AND RECEIVER CIRCUIT THEREOF

(75) Inventor: Chun-Yi Huang, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 1118 days.

(21) Appl. No.: 11/952,151

(22) Filed: Dec. 7, 2007

(65) Prior Publication Data

US 2009/0088084 A1 Apr. 2, 2009

(30) Foreign Application Priority Data

Sep. 28, 2007 (TW) ............................... 96136234 A

(51) Int. Cl.
*G06F 3/038* (2006.01)

(52) U.S. Cl. ......... 345/204; 375/286; 375/295; 375/316

(58) Field of Classification Search .................. 345/204, 345/208, 87–100; 375/286, 288, 295, 316, 375/257; 326/30–34
See application file for complete search history.

(56) References Cited

U.S. PATENT DOCUMENTS

| | | | | |
|---|---|---|---|---|
| 6,477,205 | B1 * | 11/2002 | Doblar et al. | 375/259 |
| 6,525,570 | B2 | 2/2003 | Yagishita et al. | |
| 7,012,597 | B2 * | 3/2006 | Kasai | 345/204 |
| 2002/0158667 | A1 * | 10/2002 | Yagishita et al. | 326/86 |
| 2005/0047511 | A1 * | 3/2005 | Dosho et al. | 375/257 |
| 2006/0227124 | A1 * | 10/2006 | Kim et al. | 345/204 |
| 2007/0176911 | A1 * | 8/2007 | Inoue | 345/204 |

FOREIGN PATENT DOCUMENTS

| | | |
|---|---|---|
| KR | 1020050022310 | 3/2005 |
| KR | 1020060002535 | 1/2006 |
| TW | 200732879 | 9/2007 |

OTHER PUBLICATIONS

"Office Action of Kroean counterpart application", issued on Nov. 13, 2009, p. 1-5.
"Office Action of Taiwan Counterpart Application", issued on Aug. 16, 2012, p1-p4, in which the listed references were cited.

* cited by examiner

*Primary Examiner* — Hong Zhou
(74) *Attorney, Agent, or Firm* — Jianq Chyun IP Office

(57) ABSTRACT

A multi-level point-to-point transmission system including at least one terminal resistor, a transmitter circuit, and a receiver circuit is disclosed. The transmitter circuit includes a first external resistor and a transmitter. The transmitter generates a first reference current according to the first external resistor and determines a current flowed through an output terminal thereof according to a transmission data and the first reference current. The receiver circuit includes a second external resistor, a third external resistor, and at least one receiver. The receiver generates a second reference current according to the second external resistor and generates a reference voltage difference according to the second reference current and the third external resistor. The receiver judges a voltage at the receiving terminal thereof according to the reference voltage difference so as to receive the transmission data correctly.

32 Claims, 8 Drawing Sheets

MULTI-LEVEL POINT-TO-POINT TRANSMISSION SYSTEM AND TRANSMITTER CIRCUIT AND RECEIVER CIRCUIT THEREOF

CROSS-REFERENCE TO RELATED APPLICATION

This application claims the priority benefit of Taiwan application serial no. 96136234, filed on Sep. 28, 2007. The entirety of the above-mentioned patent application is hereby incorporated by reference herein and made a part of this specification.

BACKGROUND OF THE INVENTION

1. Field of the Invention

The present invention generally relates to a multi-level point-to-point transmission system and a transmitter circuit and a receiver circuit thereof, in particular, to a multi-level point-to-point transmission system and a transmitter circuit and a receiver circuit thereof applied in a large-sized display panel.

2. Description of Related Art

The techniques for fabricating display panels have gradually reached their maturity in recently years. However, the sizes and resolutions of display panels have been increased constantly in order to meet customers' requirement. However, the operation frequency inside a display panel will be increased along with the increases in the resolution and size of the display panel. A conventional transmission system in a display panel has to be disposed with a plurality of pairs of transmission lines such that it is almost impossible to make all the transmission lines to have similar electrical characteristics in a high-frequency ambient. Thus, no effective correction mechanism for correcting foregoing problem can be provided at a receiving terminal and accordingly the bit error rate of the transmission system cannot be reduced. In particular, additional cost is incurred for resolving foregoing problem in the transmission system so that product competitiveness cannot be improved.

FIG. 1A is a diagram of a conventional transmission system in a liquid crystal display (LCD) panel. The transmission system includes a timing controller TCON and a plurality of drive ICs SD1, SD2 . . . , and SDN. The timing controller TCON transmits a video data to the drive ICs SD1~SDN in the LCD panel through a pair of clock transmission lines and a plurality of pairs of transmission lines. Each pair of transmission lines is coupled to the input terminals of all the drive ICs SD1~SDN. FIG. 1B is a detailed circuit diagram of the transmission system in FIG. 1A. The timing controller TCON serves as a transmitter circuit, and the drive ICs SD1~SDN serve as receiver circuits. The timing controller TCON and the drive ICs SD1~SDN form the transmission system. The single to differential converters TX1, TX2, TX3, . . . , TXN, and TXCK output the input data DI_1, DI_2, DI_3, . . . , and DI_N and an input clock signal CKI to the comparators RX1, RX2, RX3, . . . , RXN, and RXCK at the receiving terminals of the drive ICs SD1~SDN. The comparators RX1, RX2, RX3, . . . , RXN, and RXCK at the receiving terminals of the drive ICs SD1~SDN compare the signed signals to obtain corresponding digital values 1 or 0. However, this transmission system has very complicated circuit layout, heavy transmission load, and high noise influence therefore is not suitable for a high-frequency and large-sized LCD panel.

Generally, a conventional transmission system in a display panel includes a plurality of pairs of transmission lines, wherein a data received by a receiving terminal can be easily decoded by using a simple comparator.

Along with the increase in the sizes of display panels, a multi-level point-to-point transmission mechanism has to be adopted in the transmission system of a display panel in order to reduce the transmission frequency and accordingly the transmission line effect. However, as to a receiving terminal in the multi-level point-to-point transmission system, a set of precise level comparators instead of a simple comparator is required for decoding a received data. Moreover, in a medium or large-sized display panel, all the drive ICs are controlled by the same control IC, thus, a reference voltage level at the receiving terminal of each drive IC has to be consistent with a reference voltage level at the transmitting terminal thereof in order to prevent decoding error.

As described above, by adopting a multi-level point-to-point transmission system in a large-sized display panel, the design complexity of the large-sized display panel can be greatly reduced. However, a receiving terminal in a multi-level point-to-point transmission system has to generate a reference voltage level as same as that at a transmitting terminal in order to decode a transmission data correctly, which is very difficult to be achieved due to the difference between processes. Thus, a built-in fine tune mechanism is usually adopted for offsetting the difference between processes. In addition, how to provide a same fine tune mechanism to each of the drive ICs in a display panel is to be resolved by today's display manufacturers.

SUMMARY OF THE INVENTION

The present invention is directed to a multi-level point-to-point transmission system, wherein a receiver circuit generates a reference voltage at each receiver thereof according to how a transmitter circuit generates an output current or a signal level, and the reference voltage is not affected by any ambient factor such as process, temperature, or voltage.

The present invention is directed to a transmitter circuit suitable for a multi-level point-to-point transmission system, wherein the pattern in which the transmitter circuit generates an output current or a signal level can be easily copied and is not affected by any ambient factor such as process, temperature, or voltage.

The present invention is directed to a receiver circuit suitable for a multi-level point-to-point transmission system, wherein the receiver circuit generates a reference voltage according to how a transmitter circuit generates an output current or a signal level, and the reference voltage is not affected by any ambient factor such as process, temperature, or voltage.

The present invention is also directed to a point-to-point signal transmission system, wherein a receiver circuit generates a reference voltage at each receiver thereof according to how a transmitter circuit generates an output current or a signal level, and the reference voltage is not affected by any ambient factor such as process, temperature, or voltage.

The present invention provides a multi-level point-to-point transmission system including at least one terminal resistor, a transmitter circuit, and a receiver circuit. The transmitter circuit includes a first external resistor and a transmitter. The transmitter has a first reference terminal and at least one output terminal, wherein the first reference terminal is coupled to the first external resistor, and the output terminal is coupled to the terminal resistor. The transmitter generates a first reference current according to the first external resistor and determines a current flowed through the output terminal according to a transmission data and the first reference current. The receiver circuit includes a second external resistor, a third external resistor, and at least one receiver. The receiver has a second reference terminal, a third reference terminal, and a receiving terminal, wherein the second reference terminal is coupled to the second external resistor, the third reference terminal is coupled to the third external resistor, and the receiving terminal is coupled to the output terminal of the transmitter. The receiver generates a second reference current according to the second external resistor and generates a reference voltage difference according to the second reference current and the third external resistor. The receiver judges the voltage at the receiving terminal according to the reference voltage difference so as to receive the transmission data correctly.

According to an embodiment of the present invention, the transmitter includes a transmitting-end current generator and a plurality of pulse intensity modulators. The transmitting-end current generator is coupled to the first reference terminal and generates the first reference current according to the first external resistor. The pulse intensity modulators are coupled to the transmitting-end current generator and the output terminal of the transmitter. The pulse intensity modulators determines a ratio between the current flowed through the output terminal of the transmitter and the first reference current according to the bit code of the transmission data and operates with the terminal resistor to generate a plurality of different voltage levels at the output terminal of the transmitter.

According to an embodiment of the present invention, the receiver includes a receiving-end current tracking circuit, a second voltage dividing circuit, a plurality of intensity comparators, and a plurality of thermal code decoders. The receiving-end current tracking circuit is coupled to the second reference terminal and the third reference terminal. The receiving-end current tracking circuit generates the second reference current according to the second external resistor and generates the reference voltage difference according to the second reference current and the third external resistor. The first voltage dividing circuit generates a plurality of sub-reference voltage differences according to the reference voltage difference and a second predetermined ratio. The intensity comparators are coupled to the second voltage dividing circuit and the receiving terminal and compare the voltage at the receiving terminal and some of the sub-reference voltage differences to obtain a plurality of thermal codes. The thermal code decoders are coupled to the intensity comparators for decoding the thermal codes into the transmission data.

The present invention provides a transmitter circuit suitable for a multi-level point-to-point transmission system. The transmitter circuit is coupled to at least one terminal resistor. The transmitter circuit includes a first external resistor and a transmitter. The transmitter has a first reference terminal and at least one output terminal, wherein the first reference terminal is coupled to the first external resistor, and the output terminal is coupled to the terminal resistor. The transmitter includes a transmitting-end current generator and a plurality of pulse intensity modulators. The transmitting-end current generator is coupled to the first reference terminal and generates a first reference current according to the first external resistor. The pulse intensity modulators are coupled to the transmitting-end current generator and the output terminal of the transmitter. The pulse intensity modulators determines a ratio between a current flowed through the output terminal of the transmitter and the first reference current according to the bit code of a transmission data and operates with the terminal resistor to generate a plurality of different voltage levels at the output terminal of the transmitter.

According to an embodiment of the present invention, the transmitting-end current generator includes a first voltage dividing circuit, an operational amplifier, and a current mirror. The first voltage dividing circuit generates a first reference voltage according to an input voltage and a first predetermined ratio. The operational amplifier has a first input terminal, a second input terminal, and an output terminal, wherein the first input terminal is coupled to the first voltage dividing circuit, and the second input terminal is coupled to the first reference terminal. The current mirror is coupled to the output terminal of the operational amplifier and the first reference terminal for copying and outputting the first reference current. The first reference current can be generated according to the first reference voltage and the first external resistor through foregoing couplings.

The present invention provides a receiver circuit suitable for a multi-level point-to-point transmission system. The receiver circuit includes a second external resistor, a third external resistor, and at least one receiver. The receiver has a second reference terminal, a third reference terminal, and a receiving terminal, wherein the second reference terminal is coupled to the second external resistor, and the third reference terminal is coupled to the third external resistor. The receiver includes a receiving-end current tracking circuit, a second voltage dividing circuit, a plurality of intensity comparators, and a plurality of thermal code decoders. The receiving-end current tracking circuit is coupled to the second reference terminal and the third reference terminal. The receiving-end current tracking circuit generates a second reference current according to the second external resistor and generates a reference voltage difference according to the second reference current and the third external resistor. The second voltage dividing circuit generates a plurality of sub-reference voltage differences according to the reference voltage difference and a second predetermined ratio. The intensity comparators are coupled to the second voltage dividing circuit and the receiving terminal of the receiver and compare a voltage at the receiving terminal of the receiver and some of the sub-reference voltage differences to obtain a plurality of thermal codes. The thermal code decoders are coupled to the intensity comparators for decoding the thermal codes into the transmission data.

According to an embodiment of the present invention, the receiving-end current tracking circuit includes a third voltage dividing circuit, an operational amplifier, and a switch circuit. The third voltage dividing circuit generates a second reference voltage according to the input voltage and a third predetermined ratio. The operational amplifier has a first input terminal, a second input terminal, and an output terminal, wherein the first input terminal is coupled to the third voltage dividing circuit, and the second input terminal is coupled to the second reference terminal. The switch circuit has an enabling signal receiving terminal, a current input terminal, and a current output terminal, wherein the current input terminal is coupled to the second reference terminal, the current output terminal is coupled to the third reference terminal, and the enabling signal receiving terminal receives an input enabling signal in order to control whether to output the second reference current to the current output terminal of the switch circuit. The second reference current can be generated according to the second reference voltage and the second external resistor through foregoing couplings.

The present invention provides a point-to-point signal transmission system including a transmitter circuit and a receiver circuit, wherein the receiver circuit is coupled to the transmitter circuit. The transmitter circuit outputs at least one current signal according to a transmission data. The receiver circuit includes a plurality of receiving units and at least one reference unit, wherein the reference unit is coupled to the receiving units. The receiver circuit receives the current signal from the transmitter circuit and converts the current signal into a received voltage signal. The reference unit generates a reference voltage difference and transmits the reference voltage difference to the receiving units, wherein the receiving units generate a plurality of sub-reference voltage differences according to the reference voltage difference and compare the received voltage signal and the sub-reference voltage differences to obtain a digital data.

According to an embodiment of the present invention, the transmitter circuit includes a first external resistor, a first reference terminal, a transmitting-end current generator, and a pulse intensity modulator. The first reference terminal is coupled to the first external resistor, the transmitting-end current generator is coupled to the first reference terminal, and the pulse intensity modulator is coupled to the transmitting-end current generator. The transmitting-end current generator generates a first reference current according to the first external resistor. The pulse intensity modulator determines a ratio between the current signal and the first reference current according to the bit code of the transmission data. The reference unit includes a second external resistor, a third external resistor, a second reference terminal, a third reference terminal, and a receiving-end current tracking circuit. The second reference terminal is coupled to the second external resistor, the third reference terminal is coupled to the third external resistor, and the receiving-end current tracking circuit is coupled to the second reference terminal and the third reference terminal. The receiving-end current tracking circuit generates a second reference current according to the second external resistor and generates the reference voltage difference according to the second reference current and the third external resistor.

The present invention provides a multi-level point-to-point transmission system and a transmitter circuit and a receiver circuit thereof. As described above, the receiver circuit generates a reference voltage at each receiver of the receiver circuit according to how the transmitter circuit generates an output current or a signal level. Thereby the reference voltage is not affected by any ambient factor such as process, temperature, or voltage.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
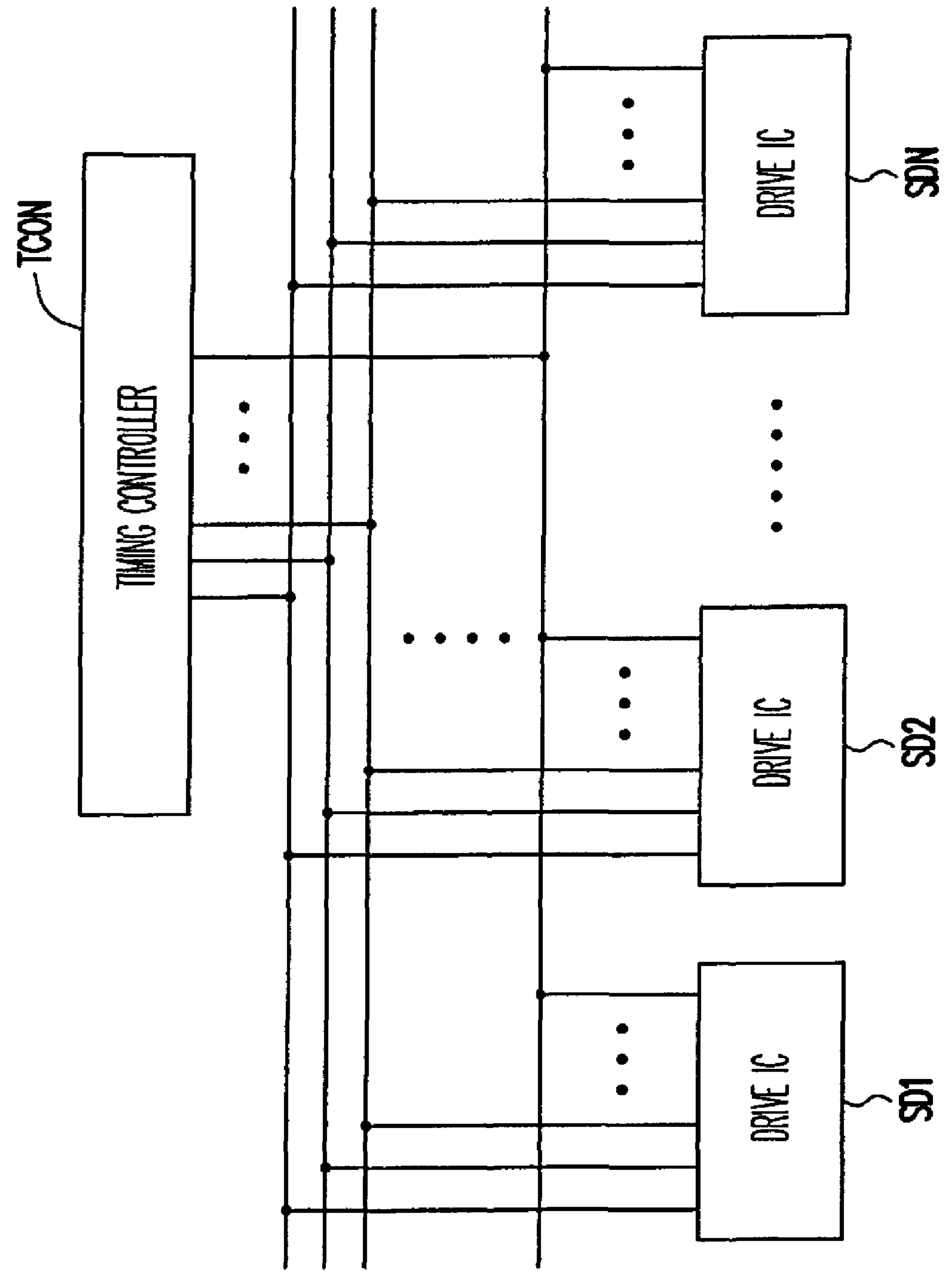
FIG. 1A (PRIOR ART)
FIG. 1A is a diagram of a conventional transmission system in a liquid crystal display (LCD) panel.
Figure 1B:
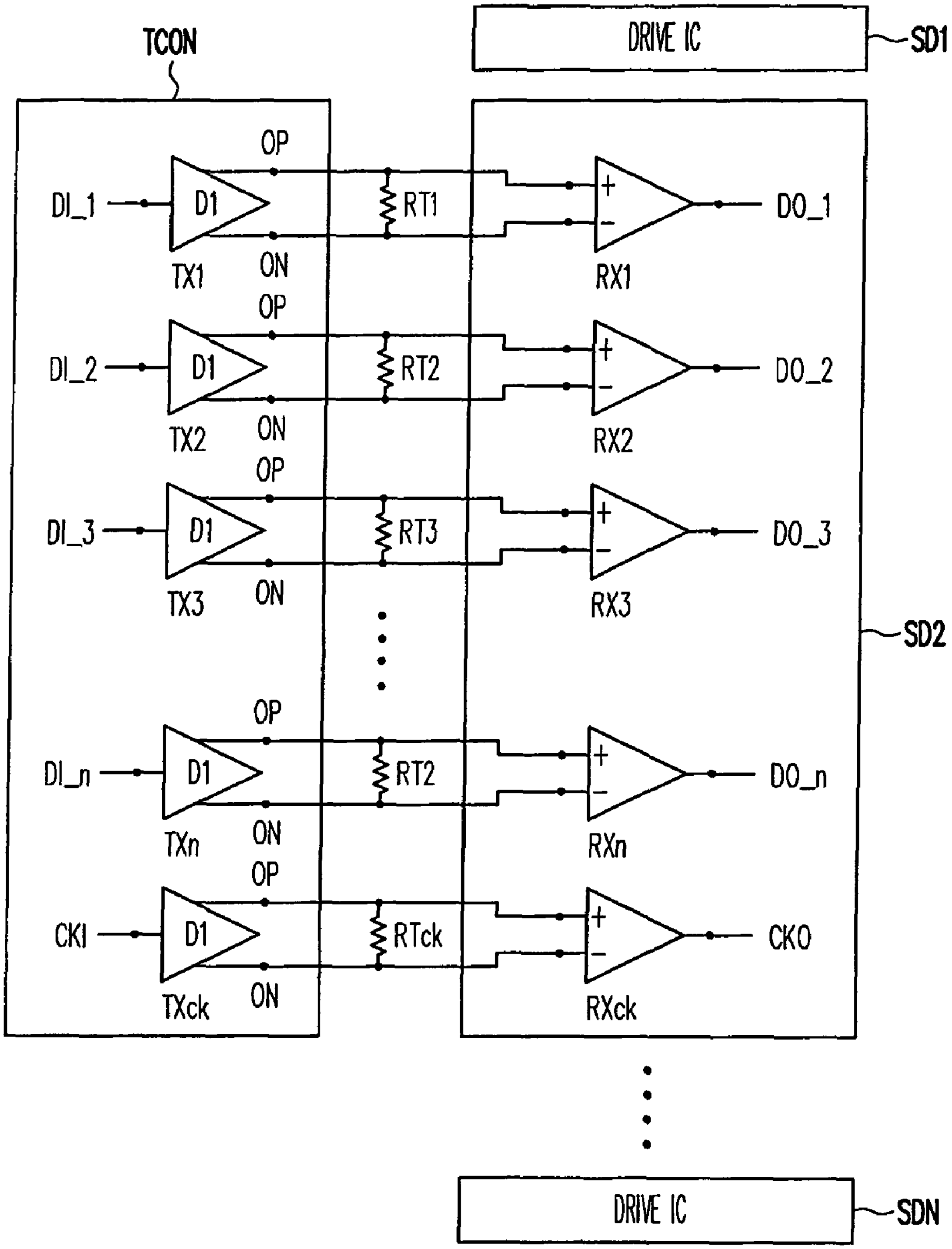
FIG. 1B (PRIOR ART)
FIG. 1B is a detailed circuit diagram of the transmission system in FIG. 1A.

Reference will now be made in detail to the present preferred embodiments of the invention, examples of which are illustrated in the accompanying drawings. Wherever possible, the same reference numbers are used in the drawings and the description to refer to the same or like parts.

The present invention provides a multi-level point-to-point transmission system, wherein a receiver circuit can generate a reference voltage at each receiver thereof according to how a transmitter circuit generates an output current or a signal level, and the reference voltage is not affected by any ambient factor such as process, temperature, or voltage. Moreover, the multi-level point-to-point transmission system is suitable for a large-sized liquid crystal display (LCD) panel.

Figure 2:
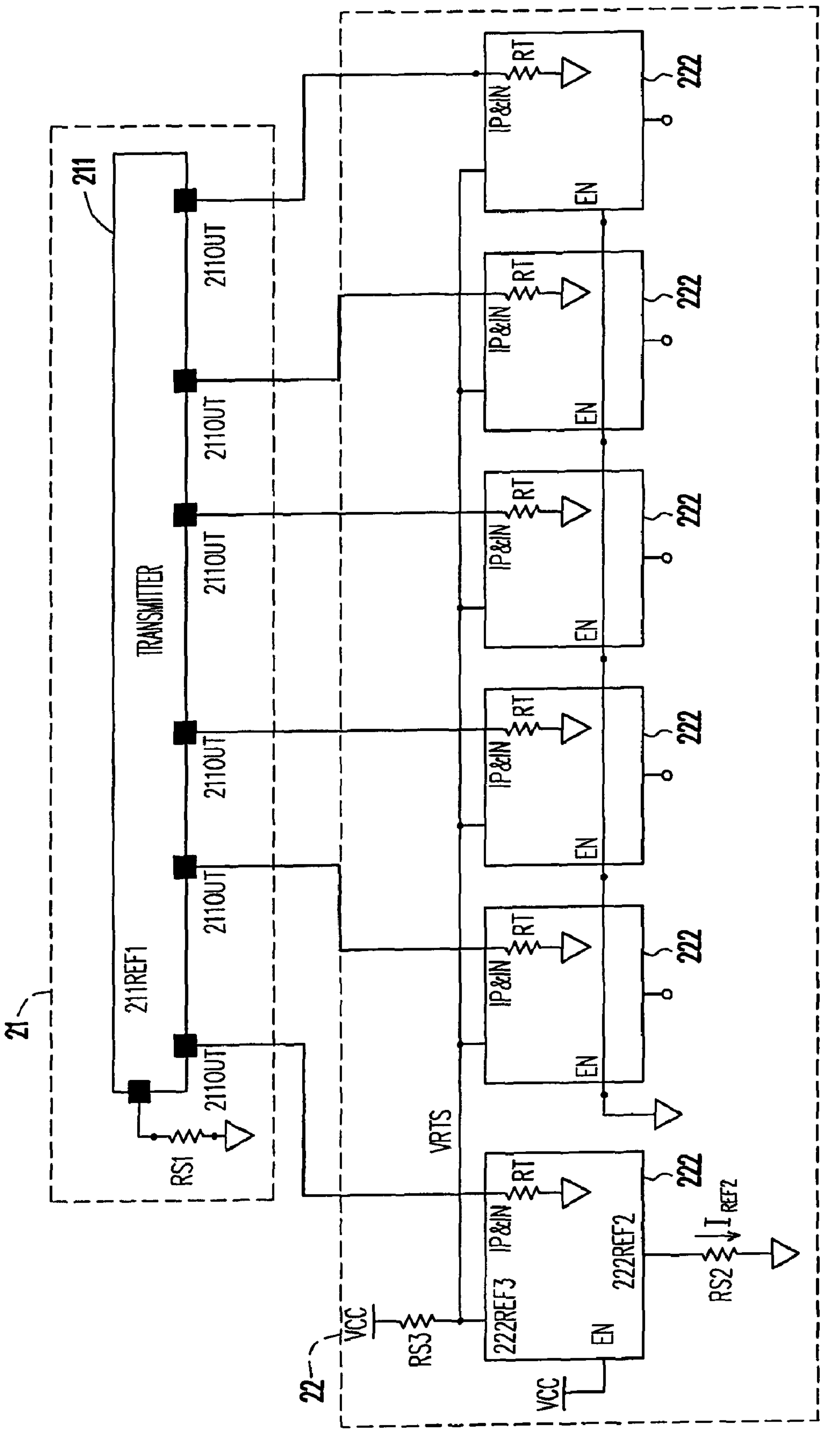
FIG. 2 illustrates a multi-level point-to-point transmission system according to an embodiment of the present invention.

FIG. 2 illustrates a multi-level point-to-point transmission system according to an embodiment of the present invention. Referring to FIG. 2, the multi-level point-to-point transmission system includes a plurality of terminal resistors RT, a transmitter circuit 21, and a receiver circuit 22. The transmitter circuit 21 includes a first external resistor RS1 and a transmitter 211. The transmitter 211 has a first reference terminal 211REF1 and a plurality of output terminals 211OUT, wherein the first reference terminal 211REF1 is coupled to the first external resistor RS1, and the output terminals 211OUT are coupled to the terminal resistors RT. The transmitter 211 generates a first reference current IREF1 according to the first external resistor RS1 and determines the currents flowed through all the output terminals 211OUT according to a transmission data to be transmitted by the transmitter 211 and the first reference current IREF1. The receiver circuit 22 includes a second external resistor RS2, a third external resistor RS3, and a plurality of receivers 222. Each of the receivers 222 has a second reference terminal 222REF2, a third reference terminal 222REF3, and a plurality of receiving terminals IP&IN, wherein the second reference terminal 222REF2 is coupled to the second external resistor RS2, the third reference terminal 222REF3 is coupled to the third external resistor RS3, and the receiving terminals IP&IN are coupled to the output terminals 211OUT of the transmitter 211. The receivers 222 generates a second reference current IREF2 according to the second external resistor RS2 and generates a reference voltage difference VCC−VRTS according to the second reference current IREF2 and the third external resistor RS3. The receivers 222 judge the voltages at the receiving terminals IP&IN according to the reference voltage difference VCC−VRTS so as to receive the transmission data from the transmitter 211 correctly.

Figure 3:
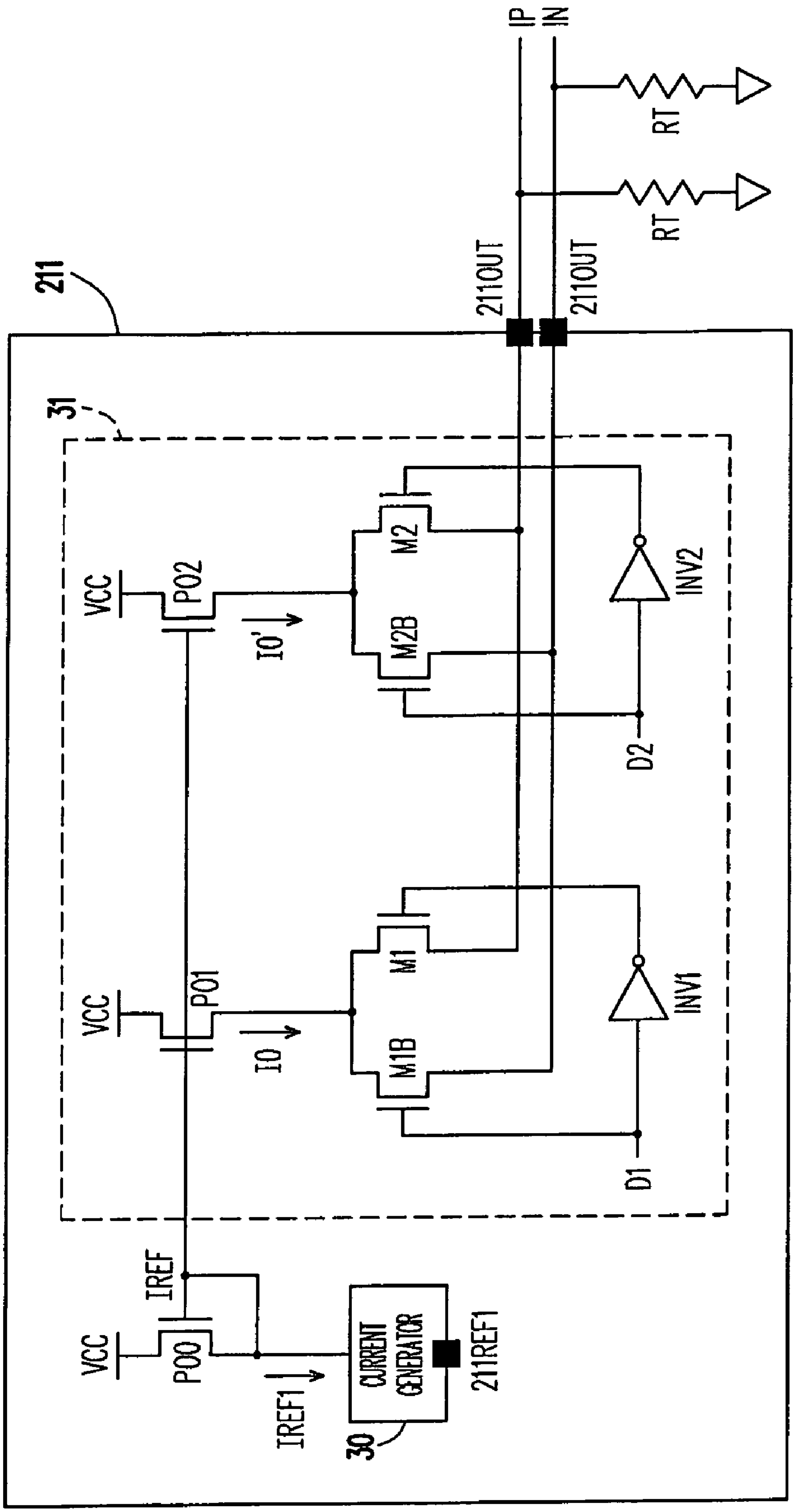
FIG. 3 is a circuit diagram of a transmitter 211 in FIG. 2.

FIG. 3 is a circuit diagram of the transmitter 211 in FIG. 2. Referring to FIG. 3, the transmitter 211 includes a transmitting-end current generator 30 and a plurality of 4-level pulse intensity modulators 31 (only one 4-level pulse intensity modulator 31 is demonstratively illustrated in FIG. 3). The transmitting-end current generator 30 is coupled to the first reference terminal 211REF1 and generates the first reference current IREF1 according to the first external resistor RS1. The pulse intensity modulator 31 is coupled to the transmitting-end current generator 30 and the output terminals 211OUT. The 4-level pulse intensity modulator 31 determines the ratios between the currents flowed through the output terminals 211OUT and the first reference current IREF1 according to the bit code of the transmission data transmitted by the transmitter 211 and operates with the terminal resistors RT to generate a plurality of different voltage levels at the output terminals 211OUT.

Assuming that in FIG. 3, the size of the transistor P01 is K times of that of the transistor P00, and the size of the transistor P02 is two times of that of the transistor P01, then the current I0=K*IREF1 and the current I0'=2*I0=2K*IREF1. Accordingly, the 4-level pulse intensity modulator 31 determines all the currents flowed through the output terminals 211OUT according to the first reference current IREF1 and the transmission data D1 and D2 to be transmitted by the transmitter 211. A plurality of different voltage levels are produced when these currents pass through the terminal resistors RT.

Figure 4:
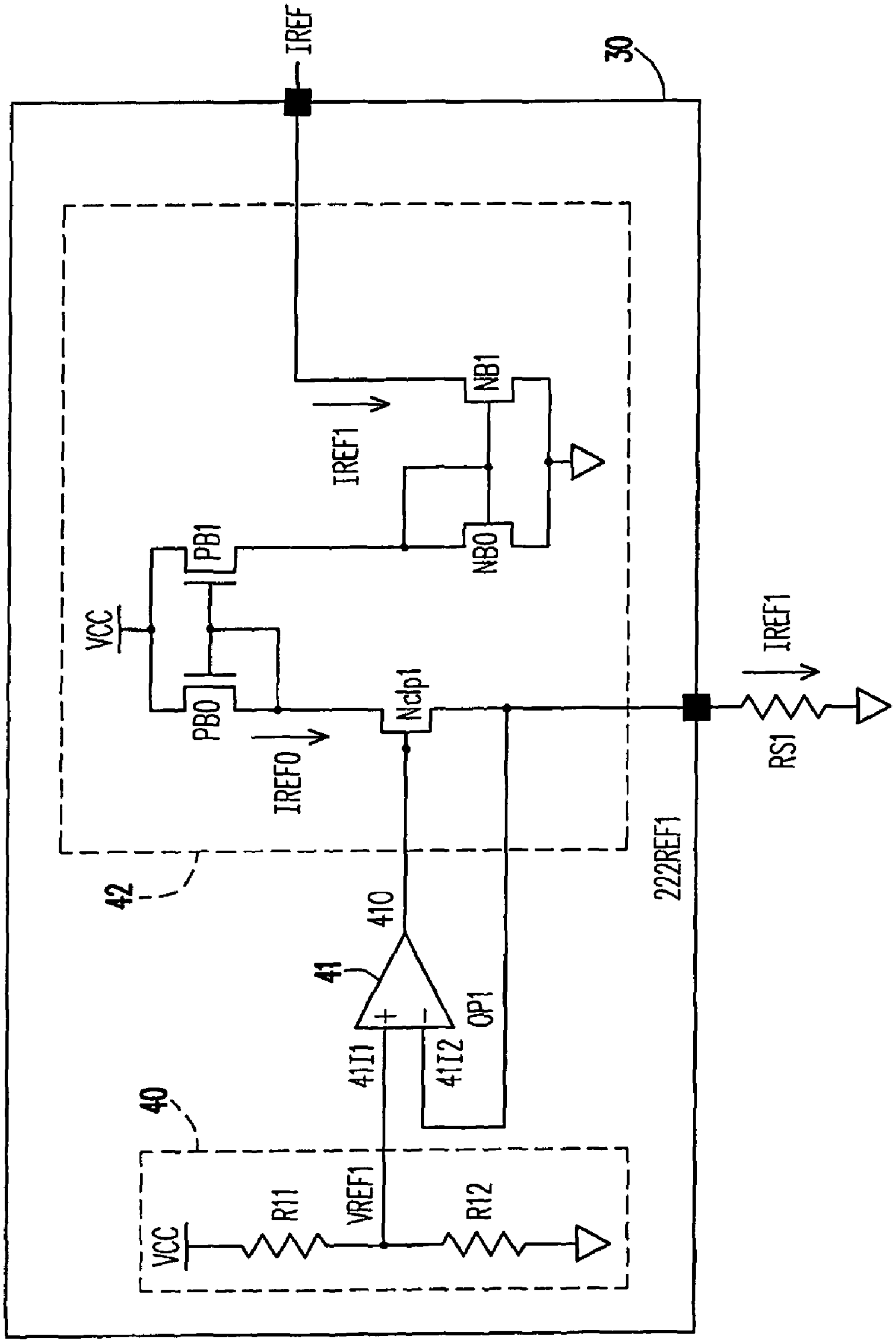
FIG. 4 is a detailed circuit diagram of a transmitting-end current generator 30 in FIG. 3.

FIG. 4 is a detailed circuit diagram of the transmitting-end current generator 30 in FIG. 3. Referring to FIG. 4, the transmitting-end current generator 30 includes a first voltage dividing circuit 40, an operational amplifier 41, and a current mirror 42. The operational amplifier 41 has a first input terminal 41I1, a second input terminal 41I2, and an output terminal 41O, wherein the first input terminal 41I1 is coupled to the first voltage dividing circuit 40, and the second input terminal 41I2 is coupled to the first reference terminal 211REF1. The current mirror 42 is coupled to the output terminal 41O of the operational amplifier 41 and the first reference terminal 211REF1. The first voltage dividing circuit 40 generates a first reference voltage VREF1=(VCC*R11)/(R11+R12) according to an input voltage VCC and a first predetermined ratio R1/(R11+R12). The transistors PB0 and PB1 and the transistors NB0 and NB1 of the current mirror 42 have the same size proportion so that the current mirror 42 can copy and output the first reference current IREF1. The first reference current IREF1 can be generated according to the first reference voltage VREF1 and the first external resistor RS1 through foregoing couplings, namely, the first reference current IREF1 is obtained by dividing the first reference voltage VREF1 by the first reference resistor RS1 (IREF1=VREF1/RS1).

Referring to FIG. 3 and FIG. 4 again, through foregoing assumptions and couplings, when the 4-level pulse intensity modulator 31 allow a current I0 to pass through the terminal resistors RT coupled to the 4-level pulse intensity modulator 31, the terminal resistors RT generate a voltage level. As shown in FIG. 3, if the transmission data D1=1 and D2=0, a current I0 is flowed through the terminal resistors RT coupled to the transistors M1B and M2B of the 4-level pulse intensity modulator 31 so that a voltage level Vamp=I0*RT is generated at the terminal resistors RT. A current which is two times of the current I0 is flowed through the terminal resistors RT coupled to the transistors M1 and M2 of the 4-level pulse intensity modulator 31 so that a voltage level which is two times of the voltage level Vamp is generated at these terminal resistors RT. If the transmission data D1=1 and D2=1, a current which is three times of the current I0 is flowed through the terminal resistors RT coupled to the transistors M1 and M2 of the 4-level pulse intensity modulator 31 so that a voltage level which is three times of the voltage level Vamp is generated at these terminal resistors RT. If the transmission data D1=0 and D2=1, the current I0 is flowed through the terminal resistors RT coupled to the transistors M1 and M2 of the 4-level pulse intensity modulator 31 so that the voltage level Vamp is generated at the terminal resistors RT. A current which is two times of the current I0 is flowed through the terminal resistors RT coupled to the transistors M1 and M2 of the 4-level pulse intensity modulator 31 so that a voltage level which is two times of the voltage level Vamp is generated at these terminal resistors RT. If the transmission data D1=0 and D2=0, a current which is three times of I0 is flowed through the terminal resistors RT coupled to the transistors M1B and M2B of the 4-level pulse intensity modulator 31 so that a voltage level which is three times of the voltage level Vamp is generated at these terminal resistors RT.

Foregoing current mirror 42 may also be a current mirror of other types, and foregoing 4-level pulse intensity modulator 31 may also be a modulator having different number of levels, such as an 8-level pulse intensity modulator. Foregoing resistors and assumptions are only used for describing the present invention but not for restricting the scope thereof, thus, any other resistors and assumptions which meet the requirements of the present invention may also be applied.

As described above, the transmitter 211 has a first reference current IREF1 which can be determined according to the first external resistor RS1. Thereby, the transmitter 211 can determine the currents flowed through the output terminals 211OUT according to the first reference current IREF1 and the transmission data D1 and D2 to be transmitted by the transmitter 211.

Figure 5:
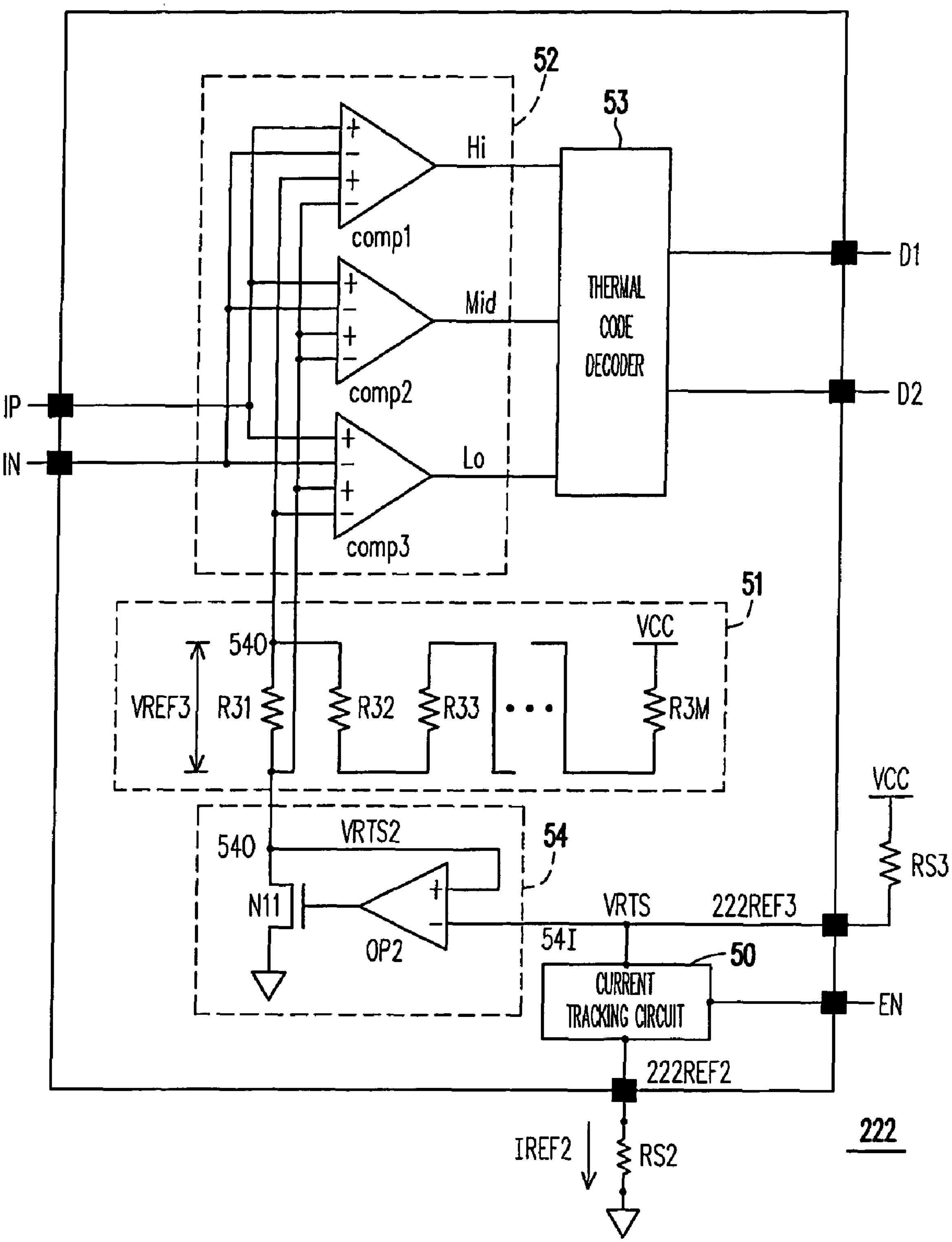
FIG. 5 is a circuit diagram of a receiver 222.

FIG. 5 is a circuit diagram of a receiver 222. Referring to FIG. 5, the receiver 222 includes a receiving-end current tracking circuit 50, a second voltage dividing circuit 51, a plurality of 4-level intensity comparators 52 (only one 4-level intensity comparator 52 is illustrated demonstratively in FIG. 5), a plurality of thermal code decoders 53 (only one thermal code decoder 53 is illustrated demonstratively in FIG. 5), and a voltage converter 54. The receiving-end current tracking circuit 50 is coupled to the second reference terminal 222REF2 and the third reference terminal 222REF3. The 4-level intensity comparator 52 is coupled to the second voltage dividing circuit 51 and the receiving terminals IP and IN of the receiver 222. The voltage converter 54 has an output terminal 54O and an input terminal 54I, wherein the input terminal 54I is coupled to the third reference terminal 222REF3, and the output terminal 54O is coupled to the second voltage dividing circuit 51. The thermal code decoder 53 is coupled to the 4-level intensity comparator 52. The receiving-end current tracking circuit 50 generates the second reference current IREF2 according to the second external resistor RS2 and generates a reference voltage difference (the reference voltage difference is equal to VCC−VRTS, wherein VRTS=VCC−RS3*IREF2) according to the second reference current IREF2 and the third external resistor RS3. The second voltage dividing circuit 51 generates a plurality of sub-reference voltage differences according to the reference voltage difference and a second predetermined ratio, wherein one of the sub-reference voltage differences is VREF3. The voltage converter 54 converts the voltage VRTS at the third reference terminal 222REF3 to the output terminal 54O. The 4-level intensity comparator 52 compares the voltage at the receiving terminals IP and IN and the sub-reference voltage difference VREF3 to obtain a thermal code. The thermal code decoder 53 decodes the thermal code into the transmission data.

As described above, the voltage converter 54 includes an operational amplifier OP2 and a field effect transistor (FET) N11. The first input terminal of the operational amplifier OP2 serves as the input terminal 54I of the voltage converter 54, and the second input terminal of the operational amplifier OP2 serves as the output terminal 54O of the voltage converter 54. The gate of the FET N11 and the output terminal of the operational amplifier OP2 are coupled to each other, the drain of the FET N11 and the output terminal 54O of the voltage converter 54 are coupled to each other, and the source of the FET N11 is grounded. Through foregoing components and the couplings thereof, the voltage converter 54 can copy the voltage at the input terminal 54I to the output terminal 54O. However, foregoing embodiment is not intended for restricting the present invention; instead, the voltage converter 54 may also be embodied differently without departing the scope and spirit of the present invention.

Figure 6:
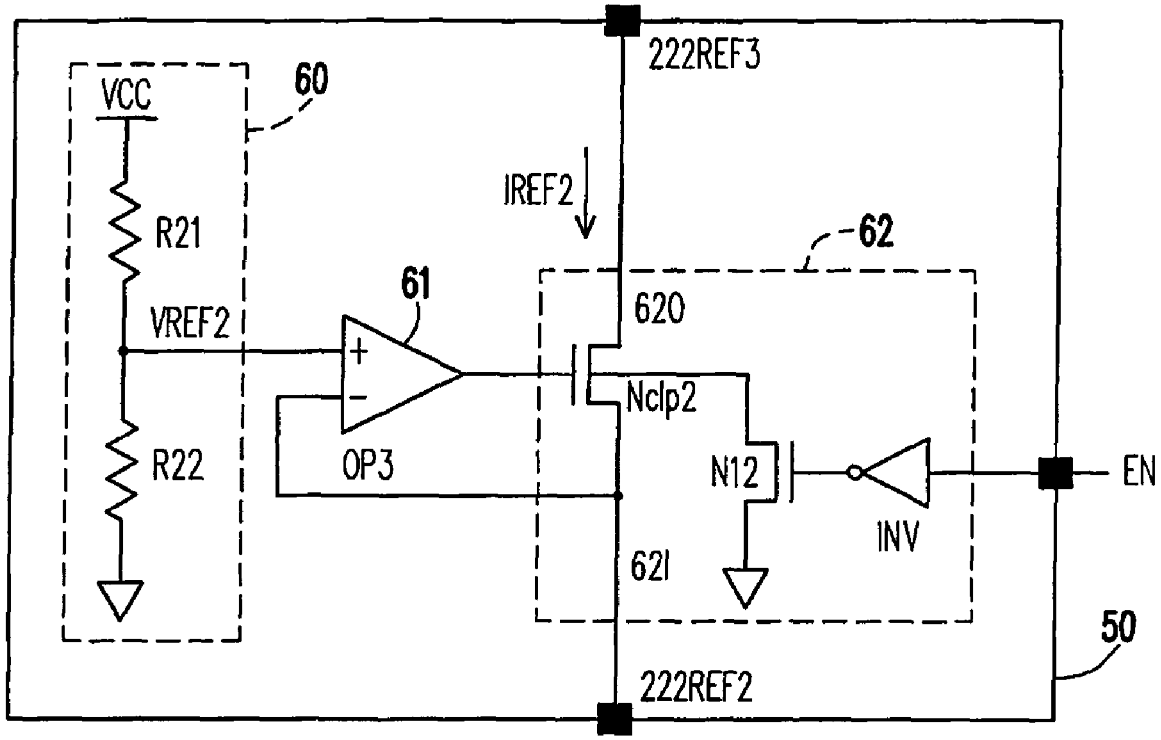
FIG. 6 is a detailed circuit diagram of a receiving-end current tracking circuit 50.

FIG. 6 is a detailed circuit diagram of the receiving-end current tracking circuit 50. Referring to FIG. 6, the receiving-end current tracking circuit 50 includes a third voltage dividing circuit 60, an operational amplifier 61, and a switch circuit 62. The third voltage dividing circuit 60 generates a second reference voltage VREF2 (VREF2=(VCC*R21)/(R21+R22)) according to an input voltage VCC and a third predetermined ratio R21/(R21+R22). The operational amplifier 61 has a first input terminal, a second input terminal, and an output terminal, wherein the first input terminal is coupled to the third voltage dividing circuit 60, and the second input terminal is coupled to the second reference terminal 222REF2. The switch circuit 62 has an enabling signal receiving terminal EN, a current input terminal 62I, and a current output terminal 62O, wherein the current input terminal 62I is coupled to the second reference terminal 222REF2, the current output terminal 62O is coupled to the third reference terminal 222REF3, and the enabling signal receiving terminal EN receives an input enabling signal so as to control whether to output the second reference current IREF2 to the current output terminal 62O. The second reference current IREF2 can be generated according to the second reference voltage VREF2 and the second external resistor RS2 (IREF2=VREF2/RS2) through foregoing couplings.

The switch circuit 62 includes an inverter INV and two FETs N12 and Nclp2. The input terminal of the inverter INV is coupled to the enabling signal receiving terminal EN. The inverter INV outputs an inverted enabling signal. The drain of the FET N12 and the gate of the FET Nclp2 are coupled to each other, the gate of the FET N12 and the output terminal of the inverter INV are coupled to each other, and the source of the FET N12 is grounded. The gate of the FET Nclp2 and the output terminal of the operational amplifier 61 are coupled to each other, the drain of the FET Nclp2 serves as the current output terminal 62O of the switch circuit 62, and the source of the FET Nclp2 serves as the current input terminal 62I of the switch circuit 62. Through foregoing components and the couplings thereof, the function of the switch circuit 62 described above can be achieved. However, the switch circuit 62 may also be implemented differently without departing the scope and spirit of the present invention.

Referring to FIG. 5, when a differential voltage received by the 4-level intensity comparator 52 is higher than the sub-reference voltage difference VREF3 provided by the second voltage dividing circuit 51, the 4-level intensity comparator 52 outputs a group of thermal codes {Hi,Mid,Lo}={1,1,1}. When the differential voltage received by the 4-level intensity comparator 52 is lower than the negative value of the sub-reference voltage difference VREF3 provided by the second voltage dividing circuit 51, the 4-level intensity comparator 52 outputs a group of thermal codes {Hi,Mid,Lo}={0,0,0}. When the differential voltage received by the 4-level intensity comparator 52 is lower than the sub-reference voltage difference VREF3 provided by the second voltage dividing circuit 51 and higher than voltage level 0, the 4-level intensity comparator 52 outputs a group of thermal codes {Hi,Mid,Lo}={0,1,1}. When the differential voltage received by the 4-level intensity comparator 52 is higher than the negative value of the sub-reference voltage difference VREF3 provided by the second voltage dividing circuit 51 and lower than voltage level 0, the 4-level intensity comparator 52 outputs a group of thermal codes {Hi,Mid,Lo}={0,0,1}. In the present embodiment, the thermal code decoders 53 decode the thermal codes into the transmission data. When the thermal codes are {1,1,1}, the transmission data is obtained as {D1,D2}={1,1}. When the thermal codes are {0,1,1}, the obtained transmission is obtained as {D1,D2}={1,0}. When the thermal codes are {0,0,1}, the transmission data is obtained as {D1,D2}={0,1}. When the thermal codes are {0,0,0}, the transmission data is obtained as {D1,D2}={0,0}.

Referring to FIGS. 3, 4, 5, and 6, in order to allow the receiver circuit 22 in FIG. 5 to generate a sub-reference voltage difference VREF3 which is two times of the voltage level Vamp, the proportion between the internal resistors of the second voltage dividing circuit 51 can be adjusted to R3=R31=R32=R33= . . . =R3M during the fabrication process. Accordingly, the sub-reference voltage difference VREF3 generated by the second voltage dividing circuit 51 is VREF3=(VCC−VRTS)/M. As described above, VCC−VRTS=(VREF2/RS2)*RS3, and to allow the sub-reference voltage difference VREF3 to be exactly two times of the voltage level Vamp, VREF3=(VREF2/RS2)*RS3/M=2*K*RT*VREF1/RS1). The proportion between the internal resistors R11 and R12 of the first voltage dividing circuit 40 and the proportion between the internal resistors R21 and R22 of the third voltage dividing circuit 60 are adjusted to make the first reference voltage VREF1 to be equal to the second reference voltage VREF2 (VREF1=VREF2). The resistances of the first external resistor RS1 and the second external resistor RS2 are also made the same (RS1=RS2). Based on foregoing mathematical expressions, the sub-reference voltage difference VREF3 is two times of the voltage level Vamp as long as the resistance of the third external resistor RS3 is 2*K*M*RT (RS3=2*K*M*RT). Taking K=20, M=5, and RT=50 as example, the resistance of the third external resistor RS3 is 2*20*5*50=10000Ω. Accordingly, the receiver circuit 22 can judge the voltage at the receiving terminal according to the reference voltage difference VCC−VRTS so as to receive the transmission data from the transmitter 211 correctly.

Foregoing resistors and assumptions are only used for describing the present invention but not for restricting the scope thereof, and any other resistors and assumptions which meet the requirements of the present invention may also be applied.

Foregoing 4-level intensity comparator 52 and thermal code decoder 53 are embodied corresponding to the 4-level pulse intensity modulator 31. If the 4-level pulse intensity modulator 31 is a pulse intensity modulator having other number of levels (for example, an 8-level pulse intensity modulator), the intensity comparator and the thermal code decoder should be embodied correspondingly. In short, foregoing implementations are not intended for restricting the present invention, and any other implements which meet the requirements of the present invention may also be applied.

Figure 7:
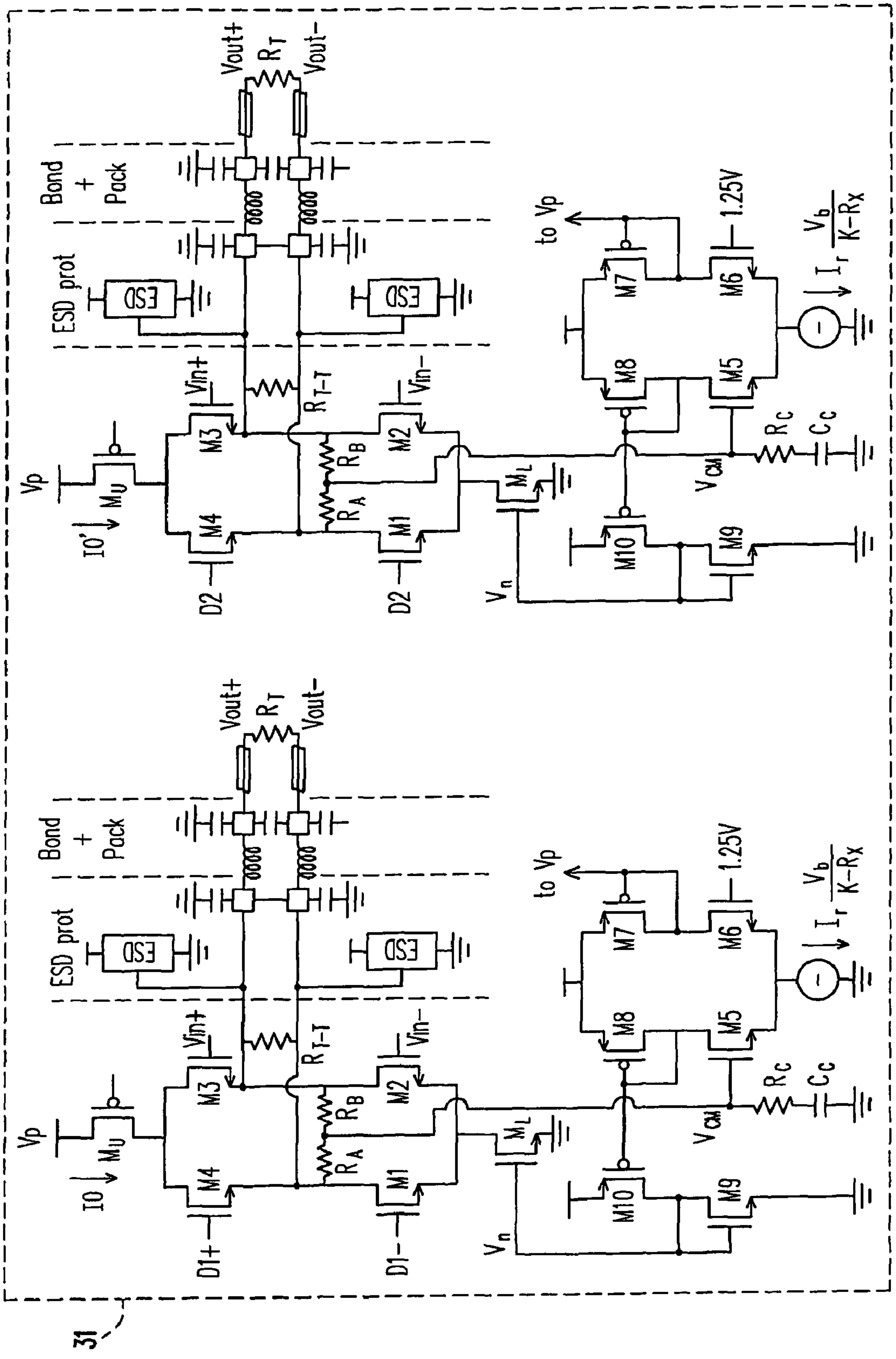
FIG. 7 illustrates a common mode feed back circuit infrastructure of a plurality of pulse intensity modulators 31 in FIG. 3.

FIG. 7 illustrates another implementation of the 4-level pulse intensity modulator 31 in FIG. 3. The 4-level pulse intensity modulator 31 illustrated in FIG. 3 has a single input circuit infrastructure, while the pulse intensity modulators 31 in FIG. 7 have a common mode feed back circuit infrastructure. The terminal resistors RT can be connected in series to the positive and negative common mode output terminals of these pulse intensity modulators 31 in order to reduce the interference of noises. The pulse intensity modulators 31 illustrated in FIG. 3 and FIG. 7 have the same function, and the only difference between the two is that the pulse intensity modulator 31 in FIG. 3 has single input and output while the pulse intensity modulators 31 in FIG. 7 have common mode input and output. The single input includes only D1 and D2, while the common mode voltage input includes D1+, D1−, D2+, and D2−, wherein D1+ is D1, D1− is the negative value of D1, D2+ is D2, and D2− is the negative value of D2.

In summary, the present invention provides a multi-level point-to-point transmission system. A receiver circuit of the transmission system generates reference voltages according to how a transmitter circuit of the transmission system generates an output current or a signal level, and the reference voltages are not affected by any ambient factor such as process, temperature, or voltage.

Moreover, the present invention provides a transmitter circuit suitable for foregoing multi-level point-to-point transmission system. The pattern in which the transmitter circuit generates an output current or a signal level is easily copied and is not affected by any ambient factor such as process, temperature, or voltage.

Furthermore, the present invention provides a receiver circuit suitable for foregoing multi-level point-to-point transmission system. The receiver circuit generates reference voltages according to how the transmitter circuit generates an output current or a signal level, and the reference voltages are not affected by any ambient factor such as process, temperature, or voltage.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A multi-level point-to-point transmission system, comprising:
- at least one terminal resistor;
- a transmitter circuit, comprising:
  - a first external resistor; and
  - a transmitter, having a first reference terminal coupled to the first external resistor and at least one output terminal coupled to the terminal resistor, the transmitter generating a first reference current according to the first external resistor and determining a current flowing through the output terminal according to transmission data and the first reference current; and
- a receiver circuit, comprising:
  - a second external resistor;
  - a third external resistor; and
  - at least one receiver, having a second reference terminal coupled to the second external resistor, a third reference terminal coupled to the third external resistor, and a receiving terminal coupled to the output terminal of the transmitter, the receiver generating a second reference current through the second external resistor and generating a reference voltage difference across the third external resistor according to the second reference current, the receiver judging a voltage at the receiving terminal according to the reference voltage difference so as to receive the transmission data correctly.

2. The multi-level point-to-point transmission system according to claim 1, wherein the transmitter comprises:
- a transmitting-end current generator, coupled to the first reference terminal, the transmitting-end current generator generating the first reference current according to the first external resistor; and
- a plurality of pulse intensity modulators, coupled to the transmitting-end current generator and the output terminal, the pulse intensity modulators determining a ratio between the current flowing through the output terminal and the first reference current according to the bit code of the transmission data and operating with the terminal resistor to generate a plurality of different voltage levels at the output terminal.

3. The multi-level point-to-point transmission system according to claim 2, wherein the transmitting-end current generator comprises:
- a first voltage dividing circuit, for generating a first reference voltage according to an input voltage and a first predetermined ratio;
- an operational amplifier, having a first input terminal coupled to the first voltage dividing circuit, a second input terminal coupled to the first reference terminal, and an output terminal; and
- a current mirror, coupled to the output terminal of the operational amplifier and the first reference terminal, the current mirror copying and outputting the first reference current,
- wherein the first reference current is generated according to the first reference voltage and the first external resistor.

4. The multi-level point-to-point transmission system according to claim 2, wherein the pulse intensity modulators have a single input circuit infrastructure or a common mode feed back circuit infrastructure.

5. The multi-level point-to-point transmission system according to claim 1, wherein the receiver comprises:
- a receiving-end current tracking circuit, coupled to the second reference terminal and the third reference terminal, the receiving-end current tracking circuit generating the second reference current according to the second external resistor and generating the reference voltage difference according to the second reference current and the third external resistor;
- a second voltage dividing circuit, for generating a plurality of sub-reference voltage differences according to the reference voltage difference and a second predetermined ratio;
- a plurality of intensity comparators, coupled to the second voltage dividing circuit and the receiving terminal, the intensity comparators comparing the voltage at the receiving terminal and a part of the sub-reference voltage differences to obtain a plurality of thermal codes; and
- a plurality of thermal code decoders, coupled to the intensity comparators, the thermal code decoders decoding the thermal codes into the transmission data.

6. The multi-level point-to-point transmission system according to claim 5, wherein the receiving-end current tracking circuit comprises:
- a third voltage dividing circuit, for generating a second reference voltage according to the input voltage and a third predetermined ratio;
- an operational amplifier, having a first input terminal coupled to the third voltage dividing circuit, a second input terminal coupled to the second reference terminal, and an output terminal; and
- a switch circuit, having an enabling signal receiving terminal, a current input terminal coupled to the second reference terminal, and a current output terminal coupled to the third reference terminal, the enabling signal receiving terminal receiving an input enabling signal so as to control whether to output the second reference current to the current output terminal,
- wherein the second reference current is generated according to the second reference voltage and the second external resistor.

7. The multi-level point-to-point transmission system according to claim 6, wherein the switch circuit comprises:

an inverter, having an input terminal coupled to the enabling signal receiving terminal, the inverter inverting the enabling signal; and a first FET and a second FET, wherein a drain of the second FET and a gate of the first FET are coupled to each other, a gate of the second FET and an output terminal of the inverter are coupled to each other, a source of the second FET is grounded, the gate of the first FET and the output terminal of the operational amplifier are coupled to each other, a drain of the first FET serves as the current output terminal of the switch circuit, and a source of the first FET serves as the current input terminal of the switch circuit.

8. The multi-level point-to-point transmission system according to claim 5, wherein the receiver further comprises:

a voltage converter, having an output terminal coupled to the second voltage dividing circuit, and an input terminal coupled to the third reference terminal, the voltage converter converting a voltage at the third reference terminal to the output terminal of the voltage converter.

9. The multi-level point-to-point transmission system according to claim 8, wherein the voltage converter comprises:

an operational amplifier, having a first input terminal serving as the input terminal of the voltage converter and a second input terminal serving as the output terminal of the voltage converter; and a field effect transistor (FET), having a gate coupled to the output terminal of the operational amplifier, a drain coupled to the output terminal of the voltage converter, and a source being grounded, wherein the voltage at the input terminal of the voltage converter is copied to the output terminal of the voltage converter.

10. The multi-level point-to-point transmission system according to claim 1, wherein the multi-level point-to-point transmission system is applied in a large-sized display panel.

11. A transmitter circuit, suitable for a multi-level point-to-point transmission system and being coupled to at least one terminal resistor, the transmitter circuit comprising:

a first external resistor; and a transmitter, having a first reference terminal coupled to the first external resistor and at least one output terminal coupled to the terminal resistor, the transmitter comprising:

a transmitting-end current generator, coupled to the first reference terminal, the transmitting-end current generator generating a first reference current according to the first external resistor, the transmitting-end current generator comprising:

a first voltage dividing circuit, for generating a first reference voltage according to an input voltage and a first predetermined ratio;

an operational amplifier, having a first input terminal coupled to the first voltage dividing circuit, a second input terminal coupled to the first reference terminal, and an output terminal; and a current mirror, coupled to the output terminal of the operational amplifier and the first reference terminal, the current mirror copying and outputting the first reference current, wherein the first reference current is generated according to the first reference voltage and the first external resistor; and a plurality of pulse intensity modulators, coupled to the transmitting-end current generator and the output terminal, the pulse intensity modulators determining a ratio between a current flowing through the output terminal and the first reference current according to the bit code of transmission data and operating with the terminal resistor to generate a plurality of different voltage levels at the output terminal.

12. The transmitter circuit according to claim 11, wherein the pulse intensity modulators have a single input circuit infrastructure or a common mode feed back circuit infrastructure.

13. The transmitter circuit according to claim 11, wherein the transmitter circuit is applied in a large-sized display panel.

14. A receiver circuit, adaptable to a multi-level point-to-point transmission system, the receiver circuit comprising:

a first external resistor;

a second external resistor; and at least one receiver, having a first reference terminal coupled to the first external resistor, a second reference terminal coupled to the second external resistor, and a receiving terminal, wherein the receiver comprises:

a receiving-end current tracking circuit, coupled to the first reference terminal and the second reference terminal, the receiving-end current tracking circuit generating a first reference current according to the first external resistor and generating a reference voltage difference according to the first reference current and the second external resistor;

a first voltage dividing circuit, for generating a plurality of sub-reference voltage differences according to the reference voltage difference and a first predetermined ratio;

a plurality of intensity comparators, coupled to the first voltage dividing circuit and the receiving terminal, the intensity comparators comparing a voltage at the receiving terminal and a part of the sub-reference voltage differences to obtain a plurality of thermal codes; and a plurality of thermal code decoders, coupled to the intensity comparators, the thermal code decoders decoding the thermal codes into a transmission data.

15. The receiver circuit according to claim 14, wherein the receiving-end current tracking circuit comprises:

a second voltage dividing circuit, for generating a first reference voltage according to the input voltage and a second predetermined ratio;

an operational amplifier, having a first input terminal coupled to the second voltage dividing circuit, a second input terminal coupled to the first reference terminal, and an output terminal; and a switch circuit, having an enabling signal receiving terminal, a current input terminal coupled to the first reference terminal, and a current output terminal coupled to the second reference terminal, the enabling signal receiving terminal receiving an input enabling signal so as to control whether to output the first reference current to the current output terminal, wherein the first reference current is generated according to the first reference voltage and the first external resistor.

16. The receiver circuit according to claim 15, wherein the switch circuit comprises:

an inverter, having an input terminal coupled to the enabling signal receiving terminal, the inverter inverting the enabling signal; and a first FET and a second FET, wherein a drain of the second FET and a gate of the first FET are coupled to each other, a gate of the second FET and the output terminal of the inverter are coupled to each other, a source of the second FET is grounded, the gate of the first FET and the output terminal of the operational amplifier are coupled to each other, a drain of the first FET serves as the current output terminal of the switch circuit, and a source of the first FET serves as the current input terminal of the switch circuit.

17. The receiver circuit according to claim 14, wherein the receiver comprises:

a voltage converter, having an output terminal coupled to the second voltage dividing circuit and an input terminal coupled to the third reference terminal, the voltage converter converting a voltage at the third reference terminal to the output terminal of the voltage converter.

18. The receiver circuit according to claim 17, wherein the voltage converter comprises:

an operational amplifier, having a first input terminal serving as the input terminal of the voltage converter and a second input terminal serving as the output terminal of the voltage converter; and a FET, having a gate coupled to the output terminal of the operational amplifier, a drain coupled to the output terminal of the voltage converter, and a source being grounded, wherein the voltage at the input terminal of the voltage converter is copied to the output terminal of the voltage converter.

19. The receiver circuit according to claim 14, wherein the receiver circuit is applied in a large-sized display panel.

20. A point-to-point signal transmission system, comprising:

a transmitter circuit having a first external resistor, outputting at least one current signal according to a transmission data; and a receiver circuit, coupled to the transmitter circuit, the receiver circuit comprising:

a plurality of receiving units, receiving the current signal from the transmitter circuit and converting the current signal into a received voltage signal; and at least one reference unit, coupled to the receiving units, the reference unit generating a reference voltage difference and transmitting the reference voltage difference to the receiving units;

wherein the receiving units generate a plurality of sub-reference voltage differences of different magnitudes according to the reference voltage difference and compare the received voltage signal and the sub-reference voltage differences to obtain a digital data.

21. The point-to-point signal transmission system according to claim 20, wherein the transmitter circuit further comprises:

a first reference terminal, coupled to the first external resistor;

a transmitting-end current generator, coupled to the first reference terminal, the transmitting-end current generator generating a first reference current according to the first external resistor; and a pulse intensity modulator, coupled to the transmitting-end current generator and an output terminal, the pulse intensity modulator determining a ratio between the current signal and the first reference current according to the bit code of the transmission data.

22. The point-to-point signal transmission system according to claim 21, wherein the transmitting-end current generator comprises:

a first voltage dividing circuit, for generating a first reference voltage according to an input voltage and a first predetermined ratio;

an operational amplifier, having a first input terminal coupled to the first voltage dividing circuit, a second input terminal coupled to the first reference terminal, and an output terminal; and a current mirror, coupled to the output terminal of the operational amplifier and the first reference terminal, the current mirror copying and outputting the first reference current, wherein the first reference current is generated according to the first reference voltage and the first external resistor.

23. The point-to-point signal transmission system according to claim 21, wherein the pulse intensity modulator has a single input circuit infrastructure or a common mode feed back circuit infrastructure.

24. The point-to-point signal transmission system according to claim 20, wherein each of the receiving units comprises:

a current-voltage converter, comprising a plurality of resistors, the current-voltage converter converting the current signal into the received voltage signal;

a second voltage dividing circuit, for generating a plurality of sub-reference voltage differences according to the reference voltage difference and a second predetermined ratio;

an intensity comparator, coupled to the current-voltage converter and the second voltage dividing circuit, the intensity comparator comparing the voltage signal and the sub-reference voltage differences to obtain a plurality of thermal codes; and a thermal code decoder, coupled to the intensity comparator, the thermal code decoder decoding the thermal codes to obtain the digital data.

25. The point-to-point signal transmission system according to claim 24, wherein each of the receiving units comprises:

a voltage converter, having an output terminal coupled to the second voltage dividing circuit and an input terminal coupled to the third reference terminal, the voltage converter converting a voltage at the third reference terminal to the output terminal of the voltage converter.

26. The point-to-point signal transmission system according to claim 25, wherein the voltage converter comprises:

an operational amplifier, having a first input terminal serving as the input terminal of the voltage converter and a second input terminal serving as the output terminal of the voltage converter; and a FET, having a gate coupled to the output terminal of the operational amplifier, a drain coupled to the output terminal of the voltage converter, and a source being grounded, wherein the voltage at the input terminal of the voltage converter is copied to the output terminal of the voltage converter.

27. The point-to-point signal transmission system according to claim 20, wherein the reference unit comprises:

a second external resistor;

a third external resistor;

a second reference terminal, coupled to the second external resistor;

a third reference terminal, coupled to the third external resistor; and a receiving-end current tracking circuit, coupled to the second reference terminal and the third reference terminal, the receiving-end current tracking circuit generating a second reference current according to the second external resistor and generating the reference voltage difference according to the second reference current and the third external resistor.

28. The point-to-point signal transmission system according to claim 27, wherein the receiving-end current tracking circuit comprises:

a first voltage dividing circuit, for generating a first reference voltage according to the input voltage and a first predetermined ratio;

an operational amplifier, having a first input terminal coupled to the first voltage dividing circuit, a second input terminal coupled to the second reference terminal, and an output terminal; and a switch circuit, having an enabling signal receiving terminal, a current input terminal coupled to the second reference terminal, and a current output terminal coupled to the third reference terminal, the enabling signal receiving terminal receiving an input enabling signal so as to control whether to output the second reference current to the current output terminal, wherein the second reference current is generated according to the first reference voltage and the second external resistor.

29. The point-to-point signal transmission system according to claim 28, wherein the switch circuit comprises:

an inverter, having an input terminal coupled to the enabling signal receiving terminal, the inverter inverting the enabling signal; and a first FET and a second FET, wherein a drain of the second FET and a gate of the first FET are coupled to each other, a gate of the second FET and the output terminal of the inverter are coupled to each other, a source of the second FET is grounded, the gate of the first FET and the output terminal of the operational amplifier are coupled to each other, a drain of the first FET serves as the current output terminal of the switch circuit, a source of the first FET serves as the current input terminal of the switch circuit.

30. The point-to-point signal transmission system according to claim 27, wherein the reference unit comprises:

a voltage converter, having an output terminal coupled to a first voltage dividing circuit and an input terminal coupled to the third reference terminal, the voltage converter converting a voltage at the third reference terminal to the output terminal of the voltage converter.

31. The point-to-point signal transmission system according to claim 20 is applied in a large-sized display panel.

32. A multi-level point-to-point transmission system, comprising:

at least one terminal resistor;

a transmitter circuit, comprising:

a first external resistor; and a transmitter, having a first reference terminal coupled to the first external resistor and at least one output terminal coupled to the terminal resistor, the transmitter generating a first reference current according to the first external resistor and determining a current flowing through the output terminal according to transmission data and the first reference current; and a receiver circuit, comprising:

a second external resistor;

a third external resistor; and at least one receiver, having a second reference terminal coupled to the second external resistor, a third reference terminal coupled to the third external resistor, and a receiving terminal coupled to the output terminal of the transmitter, the receiver generating a second reference current through the second external resistor and generating a reference voltage difference across the third external resistor according to the second reference current, the receiver judging a voltage at the receiving terminal according to the reference voltage difference so as to receive the transmission data correctly, the receiver further comprising:

a receiving-end current tracking circuit, coupled to the second reference terminal and the third reference terminal, the receiving-end current tracking circuit generating the second reference current according to the second external resistor and generating the reference voltage difference according to the second reference current and the third external resistor;

a voltage dividing circuit, for generating a plurality of sub-reference voltage differences according to the reference voltage difference and a predetermined ratio;

a plurality of intensity comparators, coupled to the voltage dividing circuit and the receiving terminal, the intensity comparators comparing the voltage at the receiving terminal and a part of the sub-reference voltage differences to obtain a plurality of thermal codes; and a plurality of thermal code decoders, coupled to the intensity comparators, the thermal code decoders decoding the thermal codes into the transmission data.

* * * * *